United States Patent [19]

Byrnes et al.

[11] Patent Number: 5,083,725
[45] Date of Patent: Jan. 28, 1992

[54] ELASTOMERIC SWASHPLATE CONFIGURATION FOR HELICOPTERS

[75] Inventors: Francis E. Byrnes, White Plains, N.Y.; Edward S. Hibyan, Trumbull; Albert T. Krauss, Harwinton, both of Conn.

[73] Assignee: United Technologies Corporation, Hartford, Conn.

[21] Appl. No.: 598,469

[22] Filed: Oct. 11, 1990

[51] Int. Cl.⁵ .................... B64C 27/35; B64C 27/605
[52] U.S. Cl. .................... 244/17.25; 416/134 A; 416/114
[58] Field of Search ........... 244/17.25, 17.11, 17.19, 244/17.21, 17.23, 17.27; 74/60; 416/134 A, 114, 102, 107, 112, 148

[56] References Cited

U.S. PATENT DOCUMENTS

| | | | |
|---|---|---|---|
| 3,558,082 | 1/1971 | Bennie | 244/17.25 |
| 3,841,586 | 10/1974 | Broadley et al. | 244/17.25 |
| 4,232,563 | 11/1980 | Peterson et al. | 416/114 X |
| 4,588,355 | 5/1986 | Ferris et al. | 416/114 |
| 4,688,993 | 8/1987 | Ferris et al. | 74/60 X |
| 4,714,450 | 12/1987 | Byrnes et al. | 416/134 A X |
| 4,804,315 | 2/1989 | Ferris et al. | 416/114 |
| 4,877,375 | 10/1989 | Desjardins | 416/102 X |
| 4,986,735 | 1/1991 | Robinson | 416/134 A |

Primary Examiner—Joseph F. Peters, Jr.
Assistant Examiner—Carla Mattix
Attorney, Agent, or Firm—Russell M. Lipes, Jr.

[57] ABSTRACT

A swashplate configuration for helicopter which eliminates the need for scissors linkages through the use of a centering member capable of tilt and axial translation while driving torque to the rotating swashplate member through the use of elastomeric bearing assemblies each consisting of a first stack of flat laminates and a second stack of spherical laminates.

8 Claims, 2 Drawing Sheets

ELASTOMERIC SWASHPLATE CONFIGURATION FOR HELICOPTERS

DESCRIPTION

1. Technical Field

This invention relates to helicopter swashplate configurations and more particularly to a swashplate configuration having an elastomeric connection to the main rotor shaft extension and capable of tilt (cyclic pitch) and axial translation (collective pitch) while driving torque to the rotating swashplate ring.

2. Background Art

Blade pitch control in a helicopter main rotor typically is achieved through the use of a swashplate assembly for transmission of control inputs from the stationary control system to the rotating system. A scissors linkage is provided for driving or rotating a swashplate member with the main rotor shaft and for maintaining the proper alignment of the control rods which impart cyclic and collective pitch motion to the rotor blades.

The rotating scissors linkage is comprised of two metal links hinged together at one end, and forming a V-shape. The opposing ends of the links are pin mounted to the rotor shaft at one end and articulately mounted by a ball and socket fitting to the rotating swashplate ring at the other end. The swashplate assembly has proven to be a very reliable and relatively maintenance-free configuration. In contrast, the rotating scissors linkage accounts for a relatively high percentage of the necessary repairs and maintenance associated with that portion of the control system involving the swashplate assembly and the rotor hub. The bearings of the scissors linkage, particularly the spherical bearing connection to the rotating swashplate ring, wears much more rapidly than other bearings in the swashplate assembly due to Coriolis loads applied with each revolution. This is due to the radial changes in the center of gravity of the scissors linkage as the linkage opens and closes, thus causing a change in angular momentum. Accordingly, the rotating swashplate ring accelerates and decelerates once per revolution, thereby accelerating the rate of wear to the scissors linkage bearings. It is desirable, therefore, to provide a swashplate assembly which eliminates the need for a scissors linkage.

Patents directed to helicopter rotor drives and which do not include a scissors linkage include U.S. Pat. No. 3,558,082 and 4,588,355, the latter patent being assigned to Applicants' assignee.

DISCLOSURE OF INVENTION

An object of the invention is to provide a helicopter swashplate configuration having a centering member capable of tilt for cyclic pitch control and axial translation for collective pitch control through an elastomeric bearing while driving torque to the rotating swashplate member without the employment of a scissors connection.

Another object of the invention is to provide a helicopter swashplate configuration having a centering member capable of tilt and axial translation while driving torque to the rotating swashplate member through the use of at least three elastomeric bearing assemblies, each consisting of a first stack of flat laminates and a second stack of spherical laminates.

The foregoing and other objects, features and advantages will be apparent from the specification and claims and from the accompanying drawings which illustrate an embodiment of the invention.

BEST MODE FOR CARRYING OUT THE INVENTION

Figure 1:
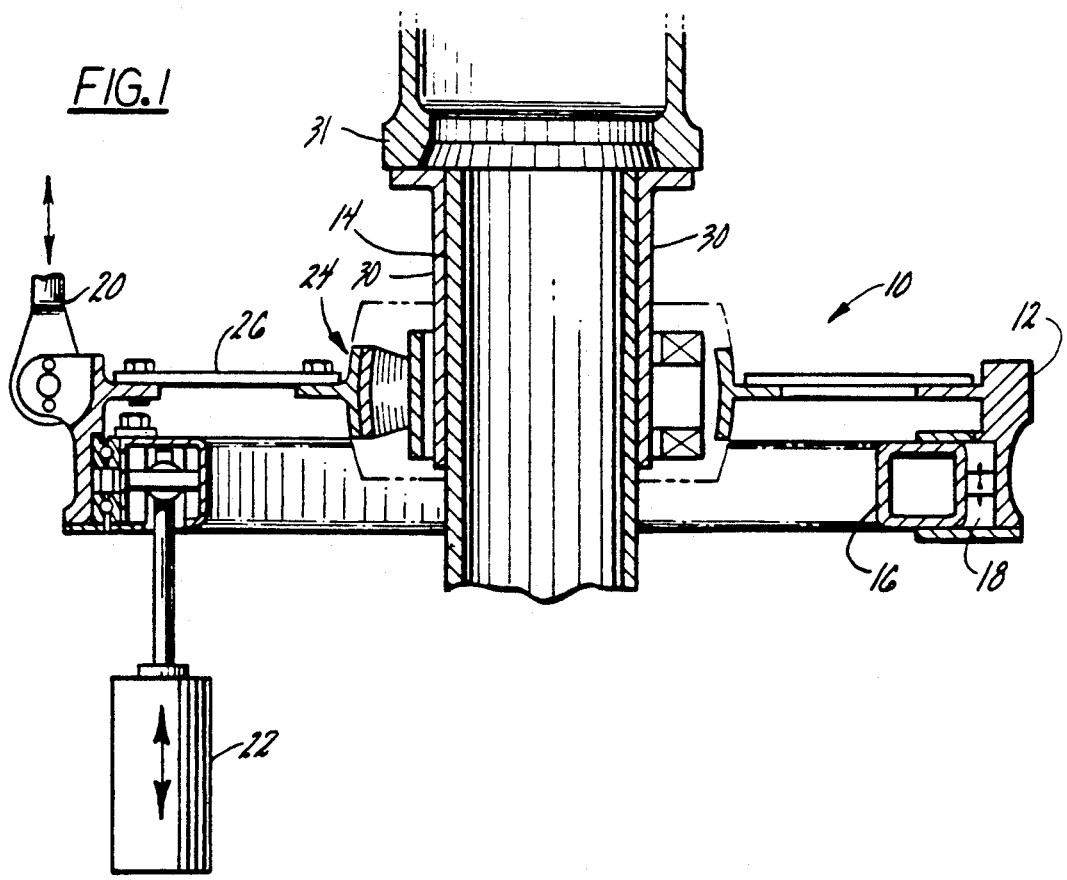
FIG. 1 is a section view of a helicopter rotor shaft having a swashplate construction in accordance with this invention.

In the rotor shaft and swashplate showing of FIG. 1, swashplate assembly 10 is shown for providing pitch control inputs to the rotor blades, not shown, of a helicopter. The swashplate assembly includes upper ring member 12 surrounding and rotating with main rotor shaft 14, and non-rotating lower ring member 16 also surrounding the main rotor shaft and connected to the upper ring member by rolling element bearing 18. The bearing transfers vertical control loads between the upper and lower ring members. Upper ring member 12 is coupled to the rotor blades by a number of control rods, one of which is shown at 20. Lower ring member 16 is coupled to at least three control input actuators, one of which is shown at 22, for determining the planar tilt and axial position of the upper and lower ring members.

Figure 2:
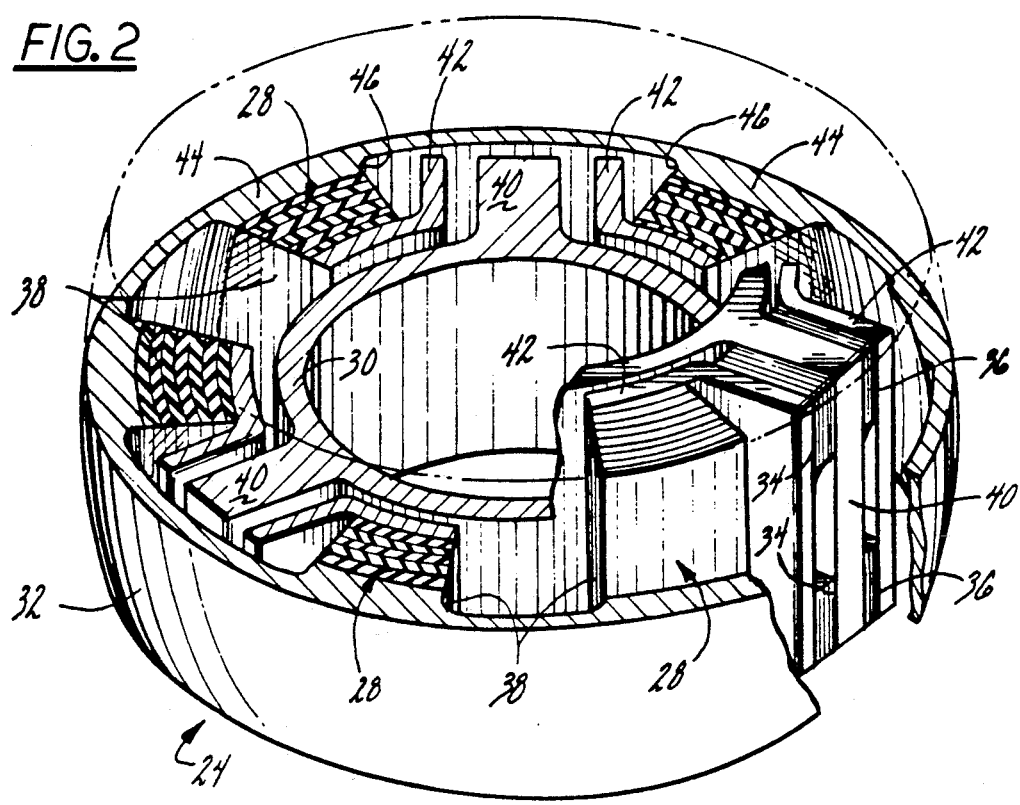
FIG. 2 is a schematic view of the elastomeric bearing assemblies for the swashplate of FIG. 1.

Spherical elastomeric centering member 24 is disposed about rotor shaft 14, and is connected by composite honeycomb annular flat plate 26 to upper ring member 12. As can be seen in FIG. 2, the centering member includes at least three elastomeric bearing assemblies 28 equally disposed about the member and rotor shaft 14. The bearing assemblies are located between sleeve member 30, an inner race, affixed to rotor hub 31 and outer race member 32 affixed to flat plate 26 as shown in FIG. 1.

Each elastomeric bearing assembly has a dual laminate configuration comprising a first stack of flat laminates 34, 36, each shown as a pair of laminates, oriented both axially and radially with respect to the main rotor shaft, and a second stack of spherical laminates 38 on either side of the flat laminates having a focal point coincident with the axis of the main rotor shaft. The first stack of flat laminates are affixed to each side of a radially extending flange 40 which is part of sleeve member 30, and may be preloaded against each other if required to prevent separation. The second stack of spherical laminates are affixed to the inner surface of outer race member 32. The first and second laminate stacks, the flat and spherical laminates, are affixed to and joined by L-shaped intermediate race 42, a radially extending portion of which forms the outer race of the flat laminates and a circumferentially extending portion of which forms the inner race of the spherical laminates. The vertical laminates 34 and 36 isolate collective motions from cyclic (tilt) motions.

By virtue of the elastomeric bearing construction and assembly, torque is transferred from the main rotor shaft to swashplate ring members 12 and 16, FIG. 1, through compression of flat laminates 34, 36 and shear of spherical laminates 38. Laminates 34 and 36 are suitable displaced vertically to preclude any tendency for inclination of intermediate race 42 when the laminates are compressive loaded. Axial translation of the swashplate ring members for collective pitch changes is accommodated through shear of the flat laminates, and tilt displacement for cyclic pitch changes is accommodated through shear of the spherical laminates.

The elastomeric bearing configuration eliminates the need for a scissors linkage inasmuch as centering member 24 serves the dual function of torque drive and accommodation of swashplate motion.

Figure 3:
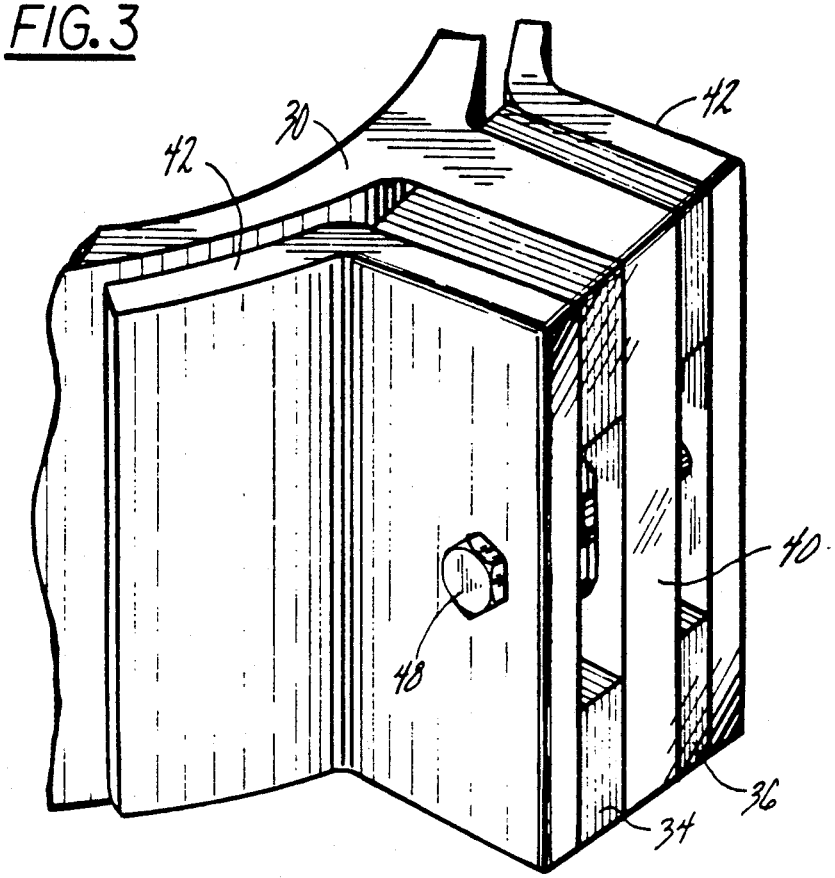
FIG. 3 is an enlarged view of one of the flanges of the bearing assembly inner race sleeve showing through-bolt preload connection of intermediate races.
Figure 4:
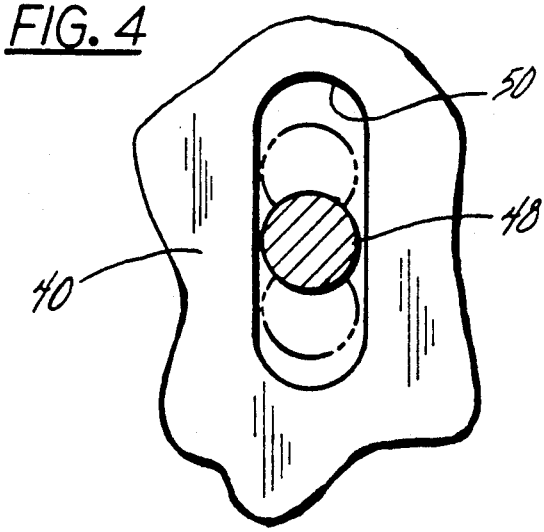
FIG. 4 is an enlarged view of the flange hole allowing collective pitch axial translations.

The orientation of the flat and spherical laminates and the decoupling of shear motion plays an important role in providing failsafe redundancy and reducing the size and weight envelope of the centering member. If one or more of the spherical laminates fails in shear, the remaining portions will contact the intermediate race 42 of the first (flat) laminates, thus maintaining the ability to drive torque. In addition, each of the spherical laminates is affixed to internal platforms 44 around the inner periphery of outer race 32. Platform edge 46 would, in the event of failure of the bonding of the spherical laminates to the outer race, abut the adjacent surface of intermediate race 42 which would limit the maximum rotation of the outer race with respect to inner race sleeve member 30. A through-bolt connection of adjacent intermediate races 42 provides fail-safe performance of the flat laminates and also provides for applying preload to the flat laminates. As shown in FIG. 3, bolt 48, extending through flange 40 connects the two radial extending faces of intermediate races 42 together. Hole 50 in flange 40, as seen in FIG. 4, is elongated to provide clearance for collective pitch axial translations. The ends of the elongated hole limit the maximum axial movement of the outer race with respect to inner sleeve member 30.

It should be understood that the invention is not limited to the particular embodiment shown and described herein, but that various changes and modifications may be made without departing from the spirit or scope of this concept as defined by the following claims.

We claim:

1. A swashplate construction for a helicopter in which a swashplate ring is driven directly by the main rotor shaft of the helicopter through a centering member employing elastomeric bearings, said swashplate comprising a first ring member circumscribing and rotating with the main rotor shaft, a second ring member circumscribing said main rotor shaft and mounted to said first ring member by means permitting relative rotation therewith, said first ring member being coupled to the rotor blades of the helicopter, said second ring member being coupled to control devices for determining the planer tilt and axial position of said first and second ring members, said centering member having an inner race affixed to said main rotor shaft and an outer race affixed to said first ring member and at least three elastomeric bearing assemblies equally disposed about and mounted between said inner and outer races, each bearing assembly including a first stack of flat laminates oriented both axially and radially with respect to said main rotor shaft and a second stack of spherical laminates having a focal point coincident with the axis of the main rotor shaft.

2. A swashplate construction in accordance with claim 1 in which the first stack of flat laminates has an inner race which is integral with the centering member inner race and the second stack of spherical laminates has an outer race which is the centering member outer race.

3. A swashplate construction in accordance with claim 1 in which an intermediate race forms the outer race of the first stack of laminates and the inner race of the second stack of laminates.

4. A swashplate construction in accordance with claim 1 in which the first stack of flat laminates has an inner race which is integral with the centering member inner race and the second stack of spherical laminates has an outer race which is the centering member outer race, and the first and second stack of laminates are joined by a common race forming the outer race of the first stack of laminates and the inner race of the second stack of laminates.

5. A swashplate construction in accordance with claim 1 in which each of said elastomeric bearing assemblies has a pair of flat laminates and a pair of spherical laminates.

6. A swashplate construction in accordance with claim 1 in which said centering member inner race has flange means forming an inner race for said first stack of flat laminates and said centering member outer race forms an outer race for said second stack of spherical laminates, an intermediate race having a radially extending portion forming the outer race of said first stack of flat laminates and a circumferential portion forming the inner race of said second stack of spherical laminates, said intermediate race radially extending portion being located on either side of and adjacent to said centering member flange means, and means extending through said flange means for connecting said radially extending portions together.

7. A swashplate construction in accordance with claim 6 in which the flange means has an opening through which said connecting means passes and which is so shaped to permit vertical movement of the intermediate race radially extending portions with respect to said flange means.

8. A swashplate construction in accordance with claim 6 in which said centering bearing outer race has internal platforms to which each of said second stack of spherical laminates is affixed and which are so shaped to abut said intermediate race radially extending portion in the event of failure of the spherical laminates.

* * * * *